United States Patent
Dai et al.

(10) Patent No.: US 11,503,194 B1
(45) Date of Patent: Nov. 15, 2022

(54) COUPLING SYSTEM FOR A PERIPHERAL DEVICE

(71) Applicant: Logitech Europe S.A., Lausanne (CH)

(72) Inventors: Yoy Dai, Lausanne (CH); Sean Liu, Lausanne (CH); Giuseppe Russo, Redwood City, CA (US); Steven Takayama, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 17/381,981

(22) Filed: Jul. 21, 2021

(51) Int. Cl.
| | |
|---|---|
| *H04N 5/225* | (2006.01) |
| *G03B 17/56* | (2021.01) |
| *F16M 11/04* | (2006.01) |
| *F16M 13/02* | (2006.01) |

(52) U.S. Cl.
CPC ........... *H04N 5/2254* (2013.01); *F16M 11/04* (2013.01); *F16M 13/022* (2013.01); *G03B 17/561* (2013.01); *G03B 17/566* (2013.01); *H04N 5/2252* (2013.01); *H04N 5/2253* (2013.01); *F16M 2200/021* (2013.01); *G03B 2217/002* (2013.01)

(58) Field of Classification Search
CPC ............... H04N 5/2251; H04N 5/2252; H04N 5/22521; H04N 5/22525; H04N 5/225251; H04N 5/2253; H04N 5/2254; H04N 5/2256; H04N 5/2257; H04N 5/2258; H04N 1/00535; H04N 1/00538; H04N 1/00541; H04N 5/23209; G03B 17/02; G03B 17/14; G03B 17/54; G03B 17/56; G03B 17/561; G03B 17/565; G03B 17/566; G03B 2217/00; G03B 2217/002; F16M 11/04; F16M 11/041; F16M 11/16; F16M 11/18; F16M 13/02; F16M 13/022; F16M 2200/021; F16M 2200/022; F16M 2200/024; F16M 2200/08

See application file for complete search history.

(56) References Cited

U.S. PATENT DOCUMENTS

| | | | |
|---|---|---|---|
| 9,229,299 B1 * | 1/2016 | Morion | ................. F16M 13/04 |
| 10,721,399 B2 * | 7/2020 | Kaga | ...................... H04R 1/028 |
| 2006/0014563 A1 * | 1/2006 | Cheng | ................. H04M 1/0274 455/557 |

(Continued)

*Primary Examiner* — Twyler L Haskins
*Assistant Examiner* — Akshay Trehan
(74) *Attorney, Agent, or Firm* — Kilpatrick Townsend & Stockton LLP (57) ABSTRACT

A coupling system for peripheral devices may include a housing and a shaft assembly. An end of the shaft assembly is threaded and couples to and uncouples from a peripheral device by relative rotational movement between the peripheral device and the shaft assembly. An inner cavity of the housing and another end of the shaft assembly defines a limited range of rotational motion between first and second rotational positions. Rotating the shaft assembly to the first rotational position allows for the peripheral device to be rotated relative to both the shaft assembly and the housing to couple the peripheral device to the housing via the shaft assembly. With the peripheral device coupled to the shaft assembly, relative rotational motion between the peripheral device and the housing is allowed between the first rotational position and the second rotational position without rotating the peripheral device relative to the shaft assembly.

21 Claims, 7 Drawing Sheets

(56) References Cited

U.S. PATENT DOCUMENTS

2015/0070557 A1* 3/2015 Petty .................... H04N 5/2252
  348/335
2017/0311080 A1* 10/2017 Kolb ....................... G06T 5/006

* cited by examiner

COUPLING SYSTEM FOR A PERIPHERAL DEVICE

BACKGROUND

Peripheral devices, such as cameras, lighting devices, microphones, and speakers, may be coupled to or otherwise positioned around other objects. Peripheral devices can be mounted to other objects by a coupling system. However, coupling systems for the peripheral devices often only allow the peripheral devices to be positioned based on the coupling. For example, a peripheral device may only be fully coupled and secure or not fully coupled, and thus not secured, to the coupling system. Improvements in coupling systems are needed to provide users the ability to position peripheral devices while the peripheral devices are fully coupled to the coupling system.

BRIEF SUMMARY

In certain embodiments, a device for rotatably coupling to a peripheral device comprises: a housing defining an outer surface, an inner cavity, and an opening extending through the housing between the outer surface and the inner cavity; and a shaft assembly comprising a first end, a second end, and a central portion coupled to and positioned between the first end and the second end, wherein the shaft assembly defines a longitudinal axis extending between the first end and the second end, wherein the first end is positioned within the inner cavity of the housing, wherein the central portion is positioned within the opening of the housing, wherein the second end extends away from the outer surface of the housing, wherein the second end is threaded and is configured to threadedly couple to the peripheral device by relative rotational movement between the peripheral device and the shaft assembly around the longitudinal axis in a first direction, and configured to threadedly uncouple from the peripheral device by relative rotational movement between the peripheral device and the shaft assembly around the longitudinal axis in a second direction, opposite the first direction, wherein the shaft assembly is rotatably coupled to the housing so that the shaft assembly is only able to move relative to the housing in one degree of freedom, wherein the one degree of freedom comprises rotation around the longitudinal axis of the shaft assembly, wherein the inner cavity and the first end of the shaft assembly are configured to define a limited range of rotational motion in the one degree of freedom between a first rotational position and a second rotational position, wherein the limited range of rotational motion is between 180 degrees and 355 degrees; wherein the shaft assembly is configured so that rotating the shaft assembly to the first rotational position allows for the peripheral device to be rotated relative to both the shaft assembly and the housing in the first direction in order to couple the peripheral device to the housing via the shaft assembly, wherein the shaft assembly is configured so that rotating the shaft assembly to the second rotational position allows for the peripheral device to be rotated relative to both the shaft assembly and the housing in the second direction in order to uncouple the peripheral device from the housing via the shaft assembly, and wherein, with the peripheral device threadedly coupled to the shaft assembly, relative rotational motion between the peripheral device and the housing is allowed between the first rotational position and the second rotational position without rotating the peripheral device relative to the shaft assembly. The housing may be configured to prevent direct user manipulation of the first end of the shaft assembly. The peripheral device can be a light, a camera, or a microphone, and the limited range of rotational motion can allow the light, the camera, or the microphone to be aimed. The shaft assembly may include a round shaft having a first tab coupled to the first end and the inner cavity may include a cylindrical cavity having a second tab. The first tab can engage the second tab to define the limited range of rotational motion. The limited range of rotational motion can be between 250 degrees and 120 degrees or between 250 degrees and 300 degrees.

In some embodiments, an apparatus for rotatably coupling to a peripheral device may comprise: a housing defining an outer surface, an inner cavity, and an opening extending through the housing between the outer surface and the inner cavity; and a shaft assembly comprising a first end, a second end, and a central portion coupled to and positioned between the first end and the second end, wherein the shaft assembly defines a longitudinal axis extending between the first end and the second end, wherein the first end is positioned within the inner cavity of the housing, wherein the central portion is positioned within the opening of the housing, wherein the second end extends away from the outer surface of the housing, wherein the inner cavity and the first end of the shaft assembly are configured to define a limited range of rotational motion in one degree of freedom between a first rotational position and a second rotational position, wherein the shaft assembly is configured so that rotating the shaft assembly to the first rotational position allows for the peripheral device to be rotated relative to both the shaft assembly and the housing in a first direction in order to couple the peripheral device to the housing via the shaft assembly, and wherein with the peripheral device threadedly coupled to the shaft assembly, relative rotational motion between the peripheral device and the housing is allowed between the first rotational position and the second rotational position without rotating the peripheral device relative to the shaft assembly. The shaft assembly may be configured so that rotating the shaft assembly to the second rotational position allows for the peripheral device to be rotated relative to both the shaft assembly and the housing in a second direction in order to uncouple the peripheral device from the housing via the shaft assembly. The second end can be threaded and configured to threadedly couple to the peripheral device by relative rotational movement between the peripheral device and the shaft assembly around the longitudinal axis in the first direction, and configured to threadedly uncouple from the peripheral device by relative rotational movement between the peripheral device and the shaft assembly around the longitudinal axis in the second direction, opposite the first direction. The shaft assembly can be rotatably coupled to the housing so that the shaft assembly is only able to move relative to the housing in one degree of freedom, wherein the one degree of freedom comprises rotation around the longitudinal axis of the shaft assembly, wherein the inner cavity and the first end of the shaft assembly are configured to define the limited range of rotational motion in the one degree of freedom between the first rotational position and the second rotational position, and wherein the limited range of rotational motion is between 180 degrees and 355 degrees. The limited range of rotational motion may be between 250 degrees and 120 degrees or between 250 degrees and 300 degrees. The housing may prevent direct user manipulation of the first end of the shaft assembly. The peripheral device can be a light, a camera, or a microphone, and the limited range of rotational motion can allow the light, the camera, or the microphone to be aimed. The shaft assembly may include a round shaft having a first tab coupled to the first end and the inner cavity may include a cylindrical cavity having a second tab. The first tab can engage the second tab to define the limited range of rotational motion.

In some embodiments, a device for rotatably coupling to a peripheral device may comprise a housing; and a shaft assembly comprising a first end a second end and defining a longitudinal axis extending between the first end and the second end, wherein the first end is positioned within the housing, wherein the second end is threaded and extends away from the housing, wherein the second end is configured to threadedly couple to the peripheral device by relative rotational movement between the peripheral device and the shaft assembly around the longitudinal axis in a first direction with a first torque, wherein the second end is configured to threadedly uncouple from the peripheral device by relative rotational movement between the peripheral device and the shaft assembly around the longitudinal axis in a second direction, opposite the first direction, with a second torque, wherein the housing and the first end are configured to resist rotation of the shaft assembly relative to the housing with a third torque, and wherein the third torque is greater than the first torque and less than the second torque so that: with the peripheral device uncoupled from the second end, the peripheral device may be rotated in the first direction relative the housing with the first torque in order to couple the peripheral device to the second end without the shaft assembly rotating relative to the housing, and with the peripheral device coupled to the second end, the peripheral device may be rotated in the second direction relative the housing with the third torque without the peripheral device rotating relative to nor uncoupling from the second end. The housing and the first end may be configured so that a range of rotation of the shaft assembly relative to the housing is limited between a first rotational position and a second rotational position so that rotation of the peripheral device coupled to the second end in the first direction relative to the housing with a fourth torque, greater than the second torque, is stopped at the first rotational position.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which.

DETAILED DESCRIPTION

Aspects of the present disclosure relate generally to peripheral devices, and more particularly to a coupling system for peripheral devices, according to certain embodiments.

In the following description, various examples of the coupling system are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Many of the embodiments relate to novel coupling systems that can be configured to be fixed to a peripheral device. The coupling system can include a housing and a shaft assembly. A peripheral device can be threadedly coupled to the shaft assembly. The housing and the shaft assembly can be configured to define a limited range of rotational motion in one degree of freedom between a first rotational position and a second rotational position. Rotating the shaft assembly to the first rotational position can allow the peripheral device to be rotated relative to both the shaft assembly and the housing to couple the peripheral device to the housing via the shaft assembly. Once the peripheral device is threadedly coupled to the shaft assembly, relative rotational motion between the peripheral device and the housing can be allowed between the first rotational position and the second rotational position without rotating the peripheral device relative to the shaft assembly. Lighting devices, cameras, microphones, or other devices can be referred to generally as "peripheral devices" throughout this disclosure. Peripheral devices can be coupled to the shaft assembly for aiming and positioning the peripheral devices.

In some embodiments, the concepts described above can be implemented, for instance, by a device comprising a housing that defines an outer surface, an inner cavity, and an opening extending through the housing between the outer surface and the inner cavity. The device can also include a shaft assembly comprising a first end, a second end, and a central portion coupled to and positioned between the first end and the second end. The shaft assembly can define a longitudinal axis extending between the first end and the second end. The first end can be positioned within the inner cavity of the housing, the central portion can be positioned within the opening of the housing, and the second end can extend away from the outer surface of the housing. The second end can be threaded and configured to threadedly couple to the peripheral device by relative rotational movement between the peripheral device and the shaft assembly around the longitudinal axis in a first direction, and configured to threadedly uncouple from the peripheral device by relative rotational movement between the peripheral device and the shaft assembly around the longitudinal axis in a second direction, opposite the first direction. The shaft assembly can be rotatably coupled to the housing so that the shaft assembly is only able to move relative to the housing in one degree of freedom around the longitudinal axis of the shaft assembly. The inner cavity and the first end of the shaft assembly can define a limited range of rotational motion in the one degree of freedom between a first rotational position and a second rotational position. The shaft assembly can be configured so that rotating the shaft assembly to the first rotational position allows for the peripheral device to be rotated relative to both the shaft assembly and the housing in the first direction in order to couple the peripheral device to the housing via the shaft assembly. The shaft assembly can also be configured so that rotating the shaft assembly to the second rotational position allows for the peripheral device to be rotated relative to both the shaft assembly and the housing in the second direction in order to uncouple the peripheral device from the housing via the shaft assembly. When the peripheral device is threadedly coupled to the shaft assembly, relative rotational motion between the peripheral device and the housing can occur between the first rotational position and the second rotational position without rotating the peripheral device relative to the shaft assembly.

It is to be understood that this high level summary is presented to provide the reader with a baseline understanding of some of the novel aspects of the present disclosure and a roadmap to the details that follow. This high level summary in no way limits the scope of the various embodiments described throughout the detailed description and each of the figures referenced above are further described below in greater detail and in their proper scope.

Embodiments of a Coupling System

Figure 1:
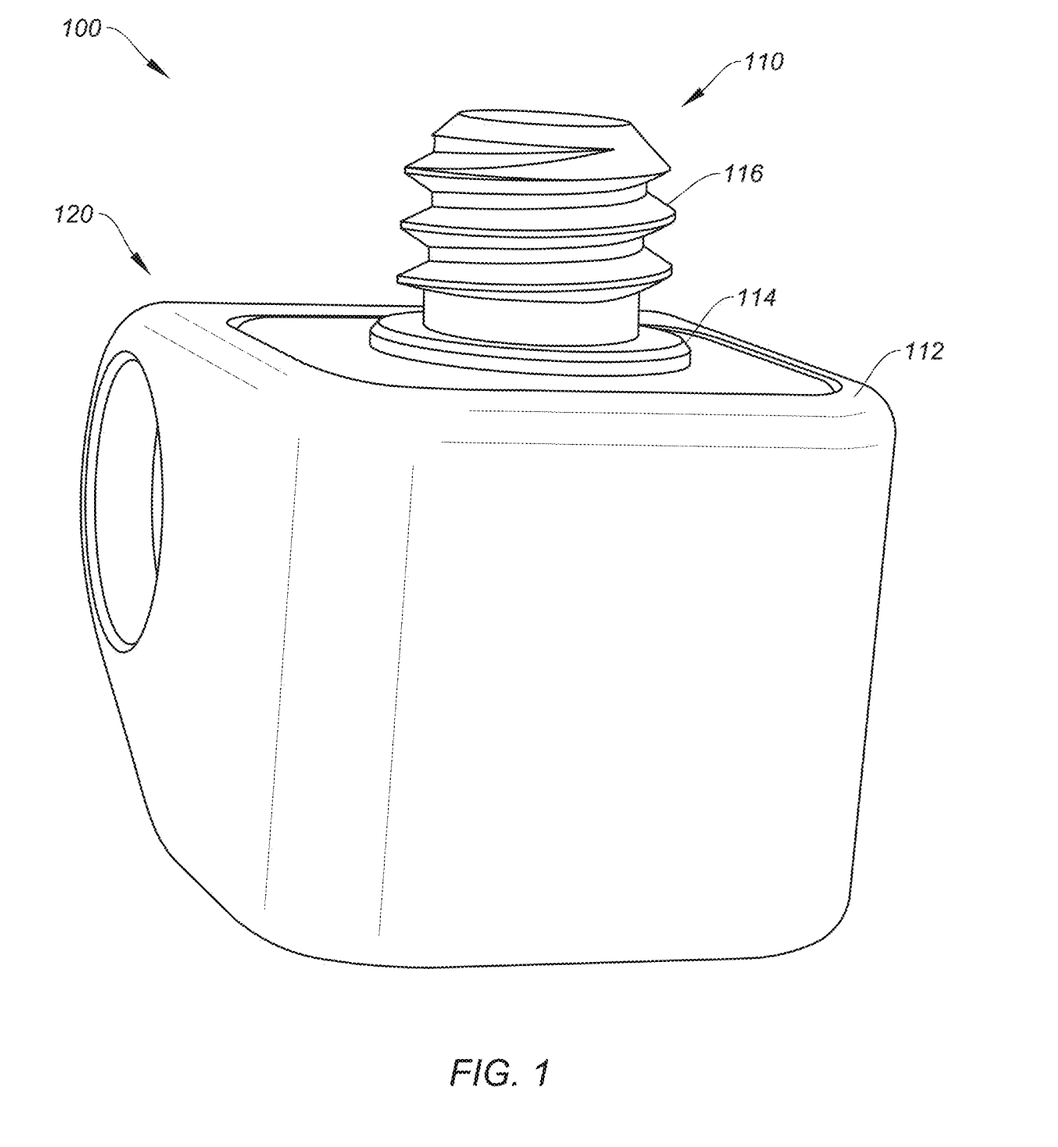
FIG. 1 shows an example of a coupling system for a peripheral device, according to certain embodiments.

FIG. 1 shows an example of a coupling system 100 for a peripheral device, according to certain embodiments. The coupling system 100 can include a shaft assembly 110 that is coupled to and positioned within a housing 120. The housing 120 can define an outer surface 122, an inner cavity 226 (shown in FIG. 2), and an opening 224 (shown in FIG. 2) that extends through the housing 120 between the outer surface 122 and the inner cavity 226.

A first end of the shaft assembly 110 can be positioned within the inner cavity, a central portion 114 of the shaft assembly 110 can be positioned within an opening of the housing 120, and a second end 116 of the shaft assembly 110 can extend away from the outer surface 122 of the housing 120. The housing 120 may be configured to prevent direct user manipulation of the first end of the shaft assembly. The second end 116 can be threaded and configured to threadedly couple to a peripheral device, such as a light, camera, or microphone, as described in FIGS. 3-6.

Figure 2:
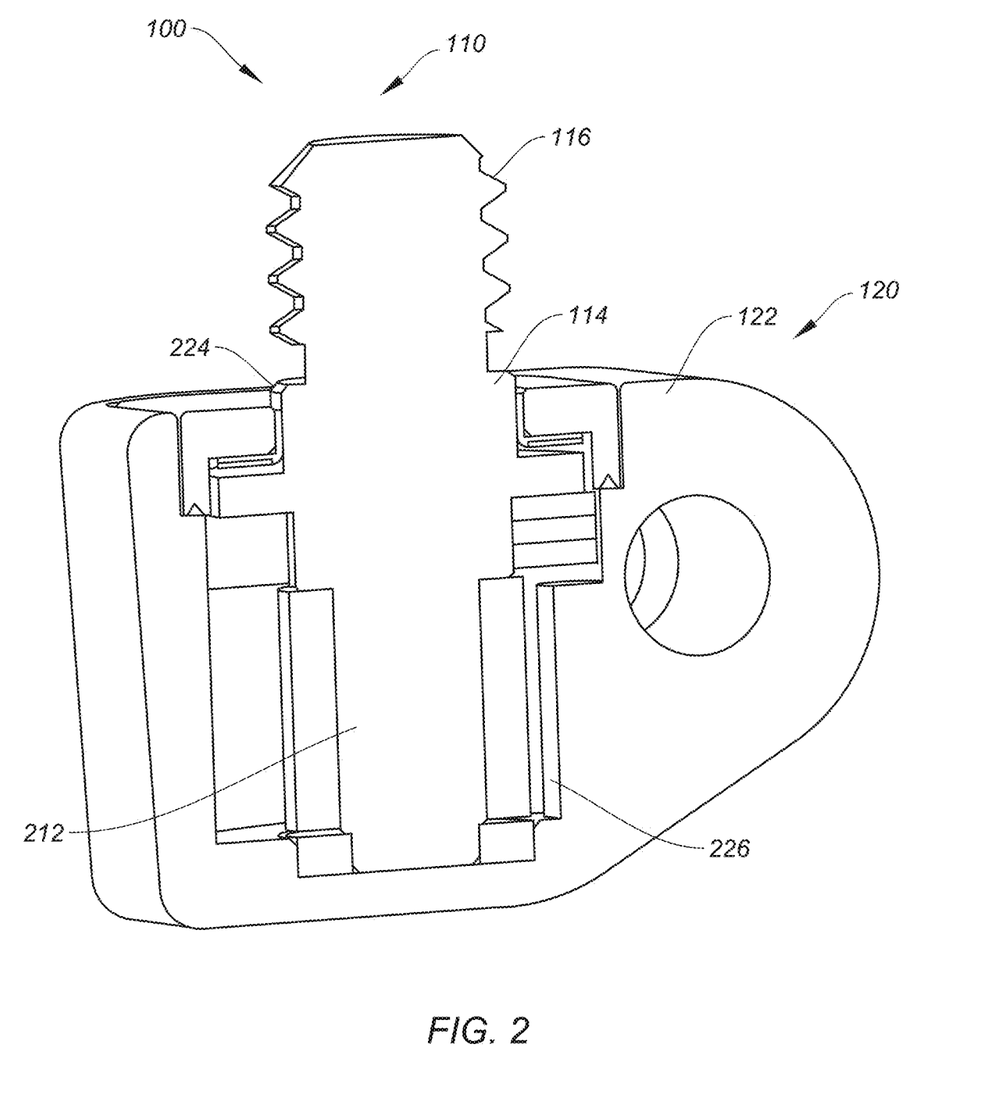
FIG. 2 shows an example of a section view of a coupling system, according to certain embodiments.

FIG. 2 shows an example of a section view of the coupling system 100 in FIG. 1, according to certain embodiments. The coupling system 100 includes a housing 120 and a shaft assembly 110. The housing 120 includes an outer surface 122, an inner cavity 226, and an opening 224 that extends through the housing 120 between the outer surface 122 and the inner cavity 226. The shaft assembly 110 includes a first end 212 positioned within the inner cavity 226, a central portion 114 positioned within the opening 224 of the housing 120, and a second end 116 that extend away from the outer surface 122 of the housing 120. The shaft assembly 110 may rotate relative to the housing 120 in one degree of freedom around a longitudinal axis defined between the first end 212 and the second end 116. The shaft assembly 110 may receive and couple a peripheral device, as further described below.

Figure 3A:
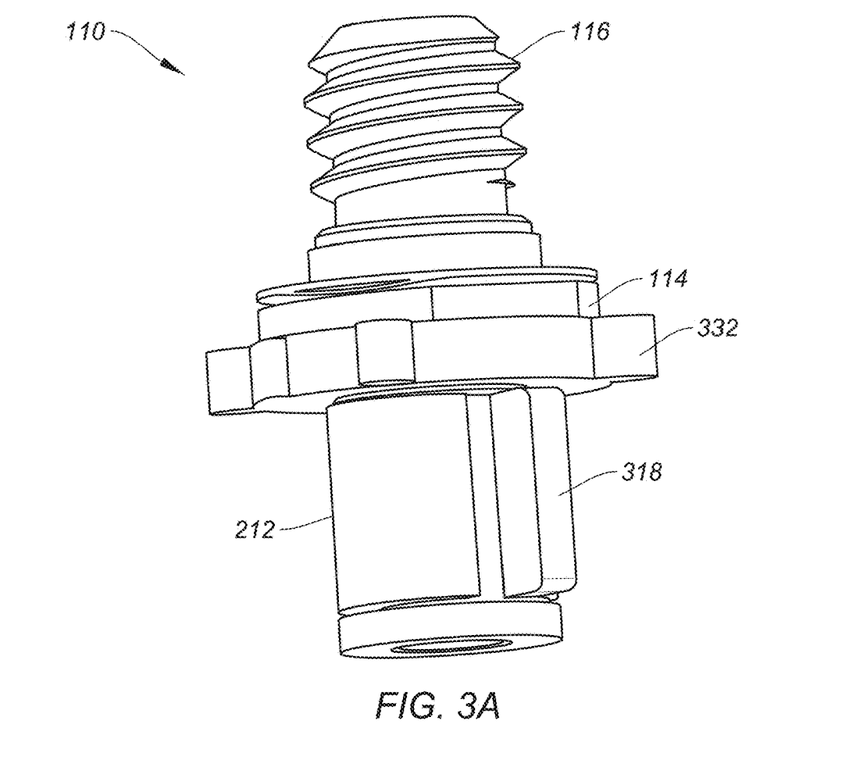
FIG. 3A shows an example of a shaft assembly of a coupling system, according to certain embodiments.
Figure 3B:
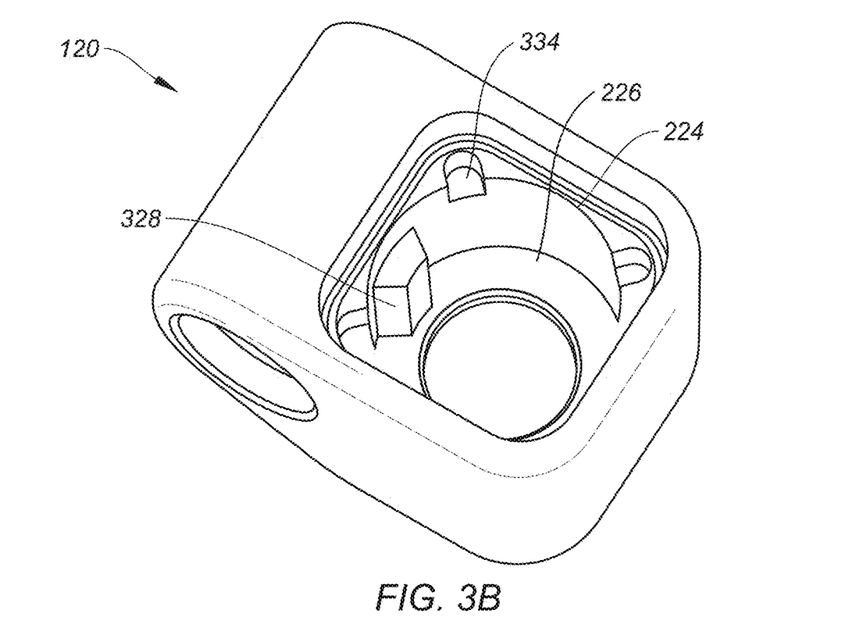
FIG. 3B shows an example of a housing of a coupling system, according to certain embodiments.

FIGS. 3A-3B show an example a shaft assembly 110 and a housing 120 of a coupling system, according to certain embodiments. As previously described, the shaft assembly 110 includes a first end 212, a central portion 114, and a second end 116. The second end 116 of the shaft assembly 110 can be threaded and configured to threadedly couple to a peripheral device. The shaft assembly 110 can have a round shaft that has a first tab 318 coupled to the first end 212. The first tab 318 can engage with an inner cavity 226 to define a limited range of rotational motion between a first rotational position and a second rotational position. The inner cavity 226 can be cylindrical and have a second tab 328 that can engage the first tab 318 when the shaft assembly 110 is positioned within the housing 120 and rotated.

In some examples, when the shaft assembly 110 is positioned within the housing 120, the shaft assembly 110 can only move in one degree of freedom relative to the housing 120. For example, the housing 120 may include indentations 334 in the inner cavity 226 that horizontal fins 332 of the housing 120 can be positioned into to rotatably couple the shaft assembly 110 to the housing 120. The shaft assembly 110 may then only able to move relative to the housing 120 in one degree of freedom (e.g., rotation around a longitudinal axis of the shaft assembly 110 extending between the first end 212 and the second end 116).

Figure 4A:
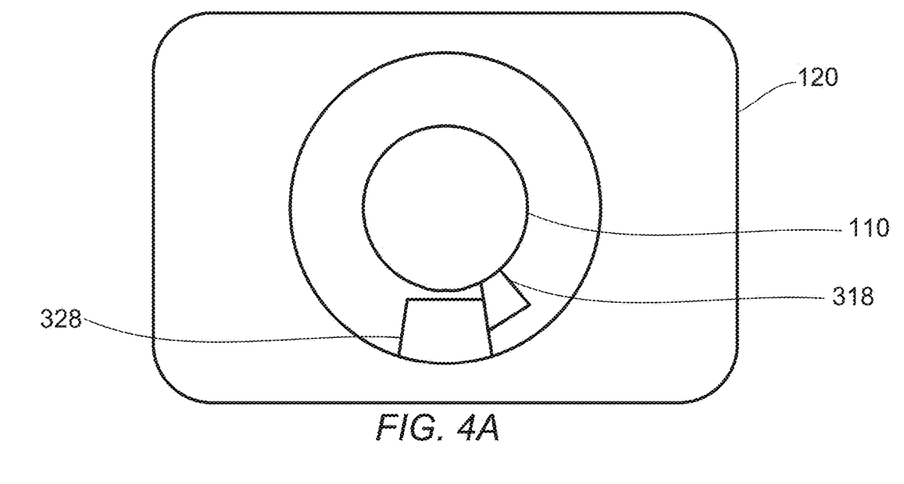
FIGS. 4A-4B show an example of a shaft assembly rotating within a housing, according to certain embodiments.
Figure 4B:
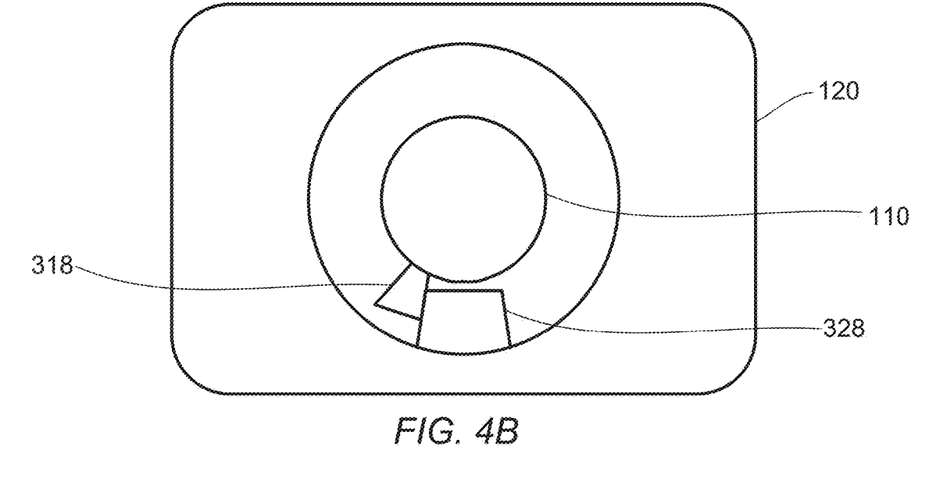

The shaft assembly 110 may be rotated in one degree of rotational freedom relative to the housing 120 between a first rotational position where a first side of the first tab 318 engages a first side of the second tab 328 as shown in FIG. 4A, and a second rotational position where a second side of the first tab 318 engages a second side of the second tab 328 as shown in FIG. 4B.

The peripheral device can be rotated relative to the shaft assembly 110 in a first direction (e.g., clockwise) with a first torque in order to threadedly couple the peripheral device to the shaft assembly 110. The peripheral device can also be rotated relative to the shaft assembly 110 in a second direction (e.g., counterclockwise) with a second torque to threadedly uncouple the peripheral device from the shaft assembly 110. The first rotational position and the second rotational position may be used to threadedly couple and threadedly uncouple the peripheral device from the shaft assembly 110. With the second end 116 positioned at a female threaded coupling of a peripheral device, rotation of the peripheral device with the first torque relative to the shaft assembly 110 in the first direction with the shaft assembly 110 at the second rotational position may cause coupling of the peripheral device to the shaft assembly 110 to begin, but full coupling may not occur until the shaft assembly 110 reaches the first rotational position. With the shaft assembly 110 at the first rotational position, the shaft assembly 110 cannot rotate further in the first direction, so the peripheral device can be threadedly coupled to the shaft assembly 110, and therefore coupled to the housing 120. Rotation of the peripheral device coupled to the shaft assembly 110 in the second direction, with the shaft assembly 110 at the first rotational position will cause the rotation of the peripheral device and the shaft assembly 110 from the first rotational position to the second rotational position relative to the housing 120. That is, once the peripheral device has been threadedly coupled to the shaft assembly 110 at the first rotational position, rotation between the first rotational position and the second rotational position will not result in the peripheral device uncoupling from the shaft assembly 110. The first end 212 and the housing 120 may resist rotation of the shaft assembly 110 relative to the housing 120 with a third torque that is greater than the first torque but less than the second torque. A sleeve coupled to an external portion of the shaft assembly 110 can create friction between the shaft assembly 110 and the housing 120 that results in the third torque. The peripheral device may be rotated in the second direction relative to the housing 120 with the third torque without the peripheral device rotating relative to nor uncoupling from the second end 116. This allows the peripheral device to be securely positioned at any desired position between the first rotational position and the second rotational position. With the peripheral device coupled to the shaft assembly 110 and the shaft assembly 110 positioned at the first rotational position, further force to cause rotation of the peripheral device relative to the shaft assembly 110 in the first direction will result in no movement, since neither the shaft assembly 110 nor the peripheral device can rotate any further in the first direction. With the peripheral device coupled to the second end 116 of the shaft assembly 110, rotation in the first direction relative to the housing 120 with a fourth torque that is greater than the second torque can be stopped at the first rotational position. At the second rotational position, further rotation of the peripheral device in the second direction with the second torque can threadedly uncouple the peripheral device from the shaft assembly 110 and the housing 120. Since the shaft assembly 110 cannot rotate relative to the housing 120 past the second rotational position in the second direction, the shaft assembly 110 remains at the second rotational position, and the peripheral device threadedly uncouples from the shaft assembly 110.

In some examples, the limited range of rotational motion may be between 180 degrees and 355 degrees. A width of the first tab 318 and/or the second tab 328 can define the limited range of rotational motion. For example, a wider first tab 318 or second tab 328 may result in a smaller limited range of rotational motion than a thinner first tab 318 or second tab 328. The limited range of rotational motion may alternatively be between 250 degrees and 320 degrees or between 250 degrees and 300 degrees.

Other embodiments may involve a limited range of motion that is greater than 360 degrees, such as up to 700 degrees. In embodiments with a limited range of motion greater than 360 degrees, the shaft assembly 110 may include an inner shaft and an outer shaft. The inner shaft can be positioned within an inner cavity of the outer shaft and rotate relative to the outer shaft. The inner shaft, the outer shaft, and the inner cavity 326 can each include one or more tabs. The inner shaft can include a tab coupled to an outer surface of the inner shaft, the outer tab can include a first tab coupled to the inner cavity and a second tab coupled to an outer surface of the outer shaft, and the inner cavity 326 can include the second tab 328. The first tab of the outer shaft may engage with the tab of the inner shaft. The second tab of the outer shaft may engage with the second tab 328 of the inner cavity 226. Rotating the inner shaft until the tab on the inner shaft engages the first tab on the outer shaft can provide 360 degrees of rotational motion. With the inner shaft's tab engaged with the outer shaft's first tab, the inner shaft and the outer shaft can rotate together until the second tab of the outer shaft engages the second tab 328 of the inner cavity 326. This rotation can provide the additional rotation beyond 360 degrees.

Figure 5A:
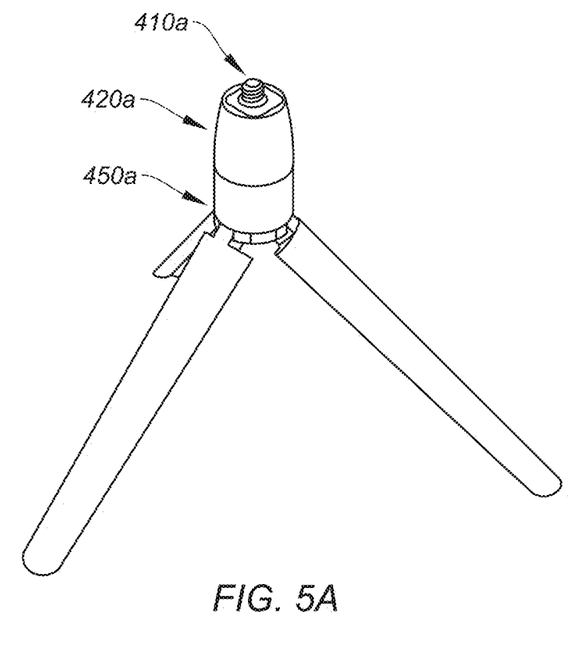
FIGS. 5A-5C show examples of housings of a coupling system, according to certain embodiments.
Figures 5B, 5C:
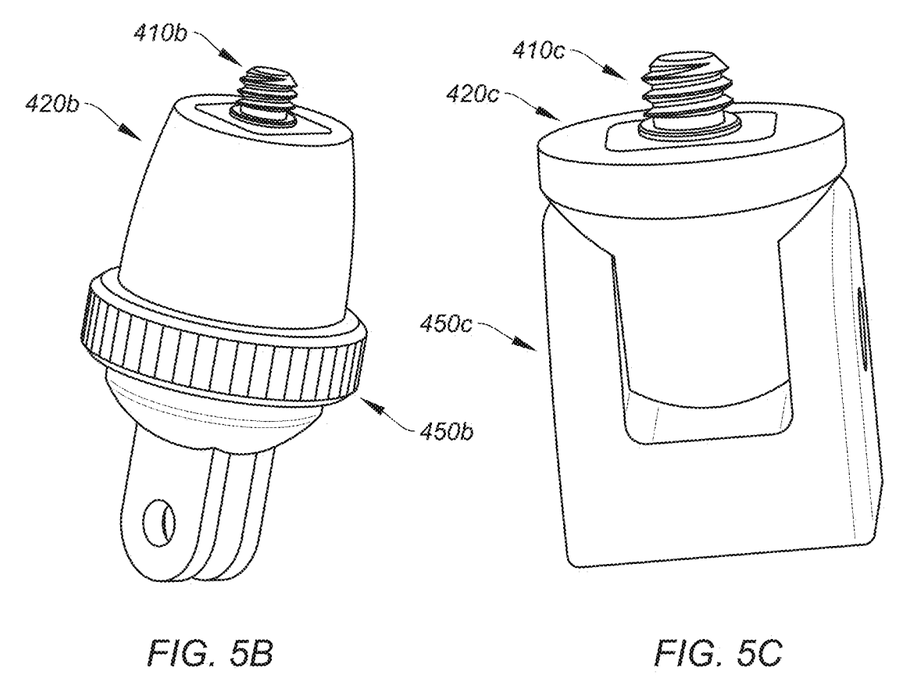

FIGS. 5A-5C show examples of housings 420*a-c* of a coupling system, according to certain embodiments. The form factor and external couplings of the housings 420*a-c* may be different from the housing 120 in FIGS. 1-4B, but the internal components may be the same. Each of the housings 420*a-c* couples to a base 450*a-c*. In FIG. 5A, the base 450*a* is a tripod, in FIG. 5B, the base 450*b* is a finger mount, and in FIG. 5C, the base 450*c* is a tilt arm. The bases 450*b-c* may be coupled to other elements as desired. Other examples may include other bases that are coupleable to a housing and a peripheral device.

A peripheral device may be coupled to each of shaft assemblies 410*a-c*, which are positioned within the housings 420*a-c*. The shaft assemblies 410*a-c* and the housings 420*a-c* can receive the peripheral devices, as described in FIG. 3, in which the peripheral devices can be coupled to the shaft assemblies 410*a-c* at a first rotational position and uncoupled from the shaft assemblies 410*a-c* at a second rotational position. Between the first rotational position and the second rotational position, the peripheral device can be rotated relative to the housings 420*a-c* but not the shaft assemblies 410*a-c*.

Figure 6A:
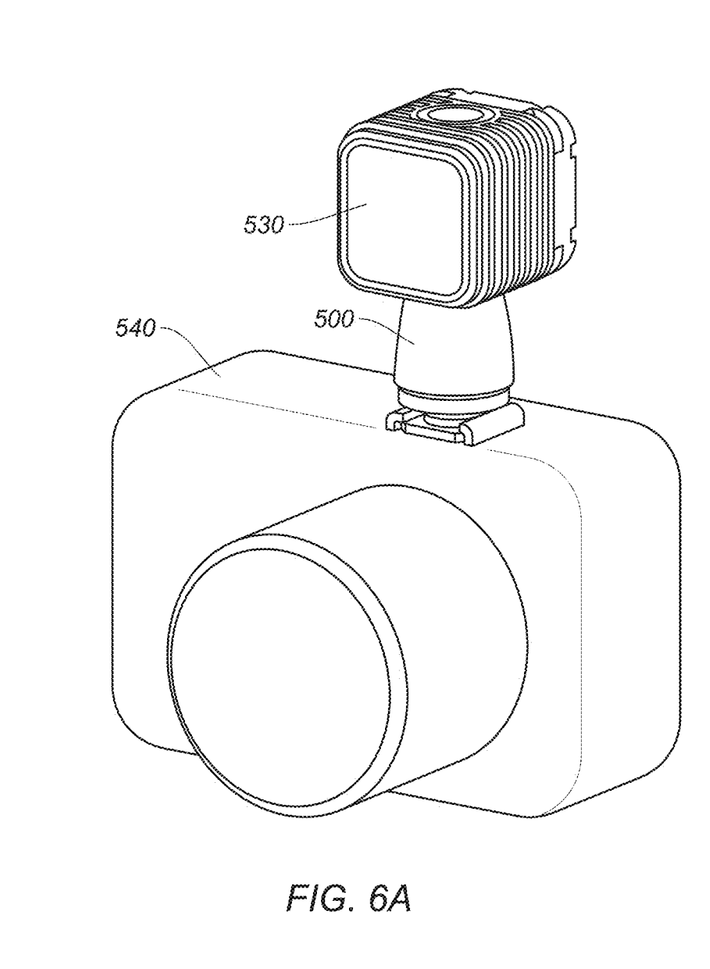
FIG. 6A shows an example of a coupling system for a camera light, according to certain embodiments.
Figure 6B:
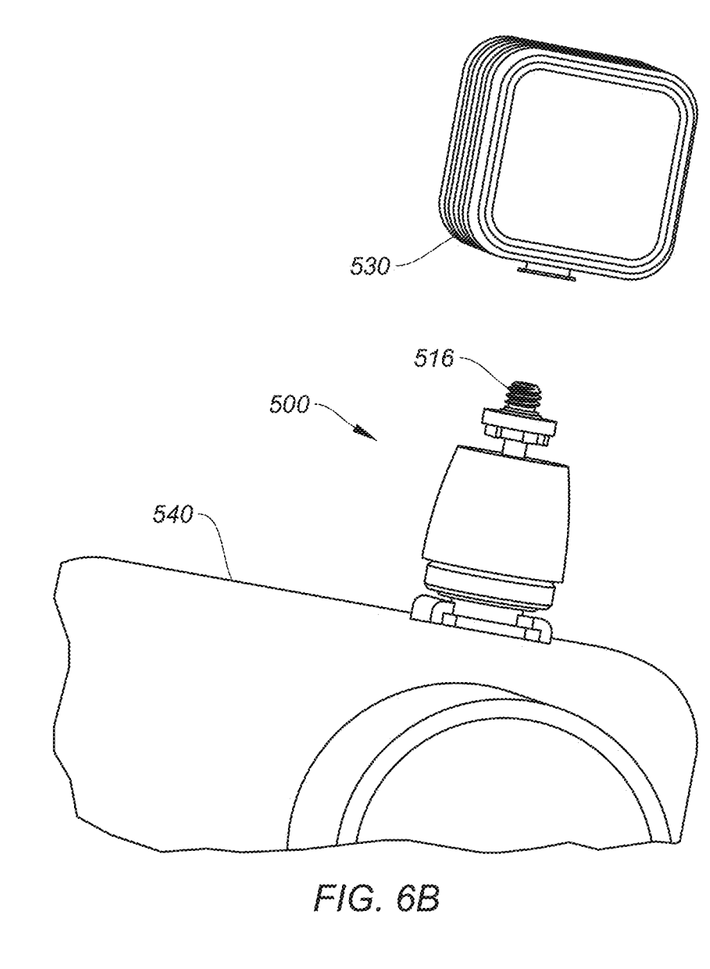
FIG. 6B shows an example of an exploded view of a coupling system for a camera light, according to certain embodiments.

FIGS. 6A-6B show an example of a coupling system 500 (e.g., a shoe) for a camera light 530, according to certain embodiments. The camera light 530 is a peripheral device that is coupled to a camera 540 by the coupling system 500. A second end 516 of a shaft assembly extends away from a housing of the coupling system 500 to threadedly couple the camera light 530. In order to couple the camera light 530 to the second end 516, the camera light 530 may be rotated in a first direction (e.g., clockwise) so that the camera light 530 is rotated in the first direction with the shaft assembly to a first rotational position, and with the shaft assembly at the first rotational position, further rotation of the camera light 530 in the first direction causes the camera light 530 to rotate relative to the shaft assembly and the housing in order to couple the camera light 530 to the shaft assembly. Then, the camera light 530 can be rotated between the first rotational position and a second rotational position, as defined by the coupling system 500, to position the camera light 530 relative to the camera 540. For example, threadedly coupling the camera light 530 to the second end 516 of the shaft assembly may occur at the first rotational position, which may position the camera light 530 at an undesirable position relative to the camera 540 (e.g., pointing away from a direction of a lens of the camera 540). The camera light 530 may then be rotated between the first rotational position and the second rotational position to point the camera light 530 in the same direction as the lens of the camera 540 without affecting the housing or the camera 540. In order to uncouple the camera light 530 from the second end 116, the camera light 530 may be rotated in a second direction (e.g., counterclockwise) with the shaft assembly so that the shaft assembly is rotated in the second direction to the second rotational position, and with the shaft assembly at the second rotational position further rotation of the camera light 530 in the second direction causes the camera light 530 to rotate relative to the shaft assembly and the housing in order to uncouple the camera light 530 from the second end 616 of the shaft assembly.

Figure 7A:
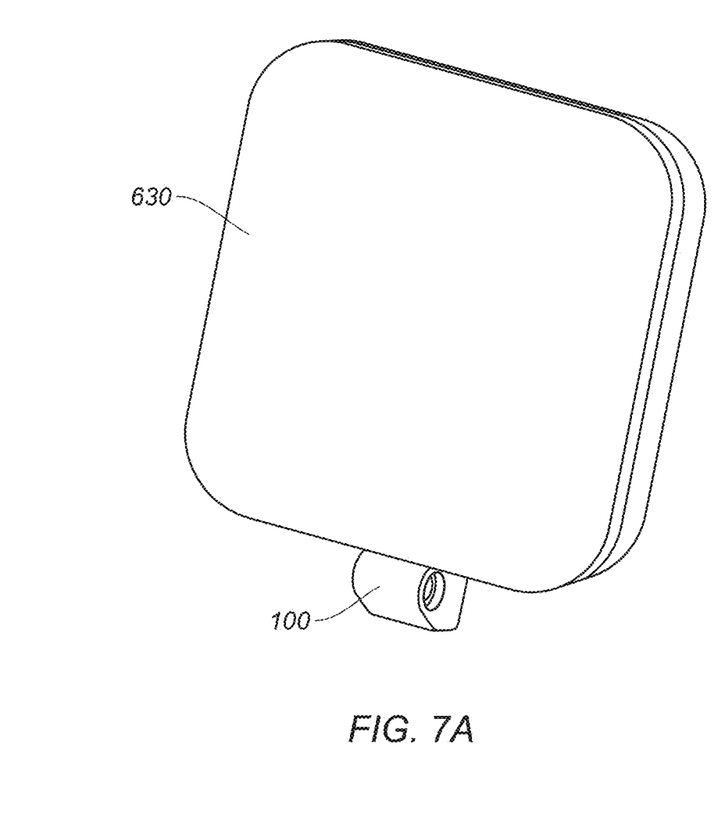
FIG. 7A shows an example of a coupling system for a light, according to certain embodiments.
Figure 7B:
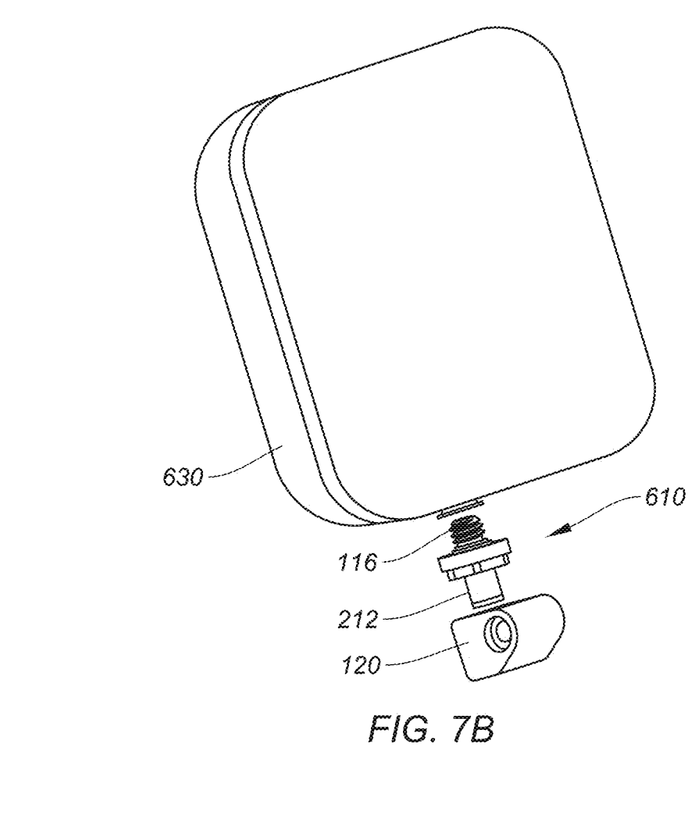
FIG. 7B shows an example of an exploded view of a coupling system for a light, according to certain embodiments.

FIGS. 7A-7B show examples of a coupling system 100 for a light 630, according to certain embodiments. Similar to the camera light 530 in FIG. 6, the light 630 is a peripheral device that may be coupled to another device or a base via the coupling system 100. A first end 212 of a shaft assembly 110 of the coupling system 100 can be positioned with a housing 120 of the coupling system. A second end 116 of the shaft assembly 110 extends away from the housing 120 of the coupling system 100 to threadedly couple the light 630. In order to couple the light 630 to the second end 116, the light 630 may be rotated in a first direction (e.g., clockwise) so that the light 630 is rotated in the first direction with the shaft assembly to a first rotational position, and with the shaft assembly at the first rotational position, further rotation of the light 630 in the first direction causes the light 630 to rotate relative to the shaft assembly and the housing in order to couple the camera light 630 to the shaft assembly. Then, the light 630 can be rotated between the first rotational position and a second rotational position, as defined by the first end 212 and an inner cavity of the coupling system 100, to position the light 630 relative to the other device or base. For example, threadedly coupling the light 630 to the second end 116 of the shaft assembly 110 may occur at the first rotational position, which may position the light 630 at an undesirable position relative to the other device or base. The light 630 may then be rotated between the first rotational position and the second rotational position to point the light 630 in a more desirable position relative to the other device or base. In order to uncouple the light 630 from the second end 116, the light 630 may be rotated in a second direction (e.g., counterclockwise) with the shaft assembly so that the shaft assembly is rotated in the second direction to the second rotational position, and with the shaft assembly at the second rotational position further rotation of the light 630 in the second direction causes the light 630 to rotate relative to the shaft assembly and the housing in order to uncouple the light 630 from the second end 116 of the shaft assembly.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, or other action "based on" one or more recited conditions or values may, in practice, be based on additional conditions or values beyond those recited.

What is claimed is:

1. A device for rotatably coupling to a peripheral device, the device comprising:
    a housing defining an outer surface, an inner cavity, and an opening extending through the housing between the outer surface and the inner cavity; and
    a shaft assembly comprising a first end, a second end, and a central portion coupled to and positioned between the first end and the second end,
    wherein the shaft assembly defines a longitudinal axis extending between the first end and the second end;
    wherein the first end is positioned within the inner cavity of the housing,
    wherein the central portion is positioned within the opening of the housing,
    wherein the second end extends away from the outer surface of the housing,
    wherein the second end is threaded and is configured to threadedly couple to the peripheral device by relative rotational movement between the peripheral device and the shaft assembly around the longitudinal axis in a first direction, and configured to threadedly uncouple from the peripheral device by relative rotational movement between the peripheral device and the shaft assembly around the longitudinal axis in a second direction, opposite the first direction,
    wherein the shaft assembly is rotatably coupled to the housing so that the shaft assembly is only able to move relative to the housing in one degree of freedom,
    wherein the one degree of freedom comprises rotation around the longitudinal axis of the shaft assembly,
    wherein the inner cavity and the first end of the shaft assembly are configured to define a limited range of rotational motion in the one degree of freedom between a first rotational position and a second rotational position, wherein the limited range of rotational motion is between 180 degrees and 355 degrees;

wherein the shaft assembly is configured so that rotating the shaft assembly to the first rotational position allows for the peripheral device to be rotated relative to both the shaft assembly and the housing in the first direction in order to couple the peripheral device to the housing via the shaft assembly, wherein the shaft assembly is configured so that rotating the shaft assembly to the second rotational position allows for the peripheral device to be rotated relative to both the shaft assembly and the housing in the second direction in order to uncouple the peripheral device from the housing via the shaft assembly, and wherein with the peripheral device threadedly coupled to the shaft assembly, relative rotational motion between the peripheral device and the housing is allowed between the first rotational position and the second rotational position without rotating the peripheral device relative to the shaft assembly.

2. The device of claim 1, wherein the housing is configured to prevent direct user manipulation of the first end of the shaft assembly.

3. The device of claim 1, wherein the peripheral device comprises a light, a camera, or a microphone and wherein the limited range of rotational motion allows the light, the camera, or the microphone to be aimed.

4. The device of claim 1, wherein the shaft assembly comprises a round shaft having a first tab coupled to the first end and the inner cavity comprises a cylindrical cavity having a second tab, wherein the first tab is configured to engage the second tab to define the limited range of rotational motion.

5. The device of claim 1, wherein the shaft assembly is configured to engage the inner cavity to define the limited range of rotational motion.

6. The device of claim 1, wherein the shaft assembly comprises a round shaft having a first tab and the inner cavity comprises a cylindrical cavity having a second tab, and wherein the first tab and the second tab are configured to engage to define the limited range of rotational motion.

7. The device of claim 1, wherein the limited range of rotational motion is between 250 degrees and 320 degrees.

8. The device of claim 1, wherein the limited range of rotational motion is between 250 degrees and 300 degrees.

9. An apparatus for rotatably coupling to a peripheral device, the apparatus comprising:
a housing defining an outer surface, an inner cavity, and an opening extending through the housing between the outer surface and the inner cavity; and
a shaft assembly comprising a first end, a second end, and a central portion coupled to and positioned between the first end and the second end,
wherein the shaft assembly defines a longitudinal axis extending between the first end and the second end;
wherein the first end is positioned within the inner cavity of the housing,
wherein the central portion is positioned within the opening of the housing,
wherein the second end extends away from the outer surface of the housing,
wherein the inner cavity and the first end of the shaft assembly are configured to define a limited range of rotational motion in one degree of freedom between a first rotational position and a second rotational position, wherein the shaft assembly is configured so that rotating the shaft assembly to the first rotational position allows for the peripheral device to be rotated relative to both the shaft assembly and the housing in a first direction in order to couple the peripheral device to the housing via the shaft assembly, and wherein with the peripheral device threadedly coupled to the shaft assembly, relative rotational motion between the peripheral device and the housing is allowed between the first rotational position and the second rotational position without rotating the peripheral device relative to the shaft assembly.

10. The apparatus of claim 9, wherein the shaft assembly is configured so that rotating the shaft assembly to the second rotational position allows for the peripheral device to be rotated relative to both the shaft assembly and the housing in a second direction in order to uncouple the peripheral device from the housing via the shaft assembly.

11. The apparatus of claim 10, wherein the second end is threaded and is configured to threadedly couple to the peripheral device by relative rotational movement between the peripheral device and the shaft assembly around the longitudinal axis in the first direction, and configured to threadedly uncouple from the peripheral device by relative rotational movement between the peripheral device and the shaft assembly around the longitudinal axis in the second direction, opposite the first direction.

12. The apparatus of claim 9, wherein the shaft assembly is rotatably coupled to the housing so that the shaft assembly is only able to move relative to the housing in one degree of freedom,
wherein the one degree of freedom comprises rotation around the longitudinal axis of the shaft assembly,
wherein the inner cavity and the first end of the shaft assembly are configured to define the limited range of rotational motion in the one degree of freedom between the first rotational position and the second rotational position, and
wherein the limited range of rotational motion is between 180 degrees and 355 degrees.

13. The apparatus of claim 12, wherein the limited range of rotational motion is between 250 degrees and 320 degrees.

14. The apparatus of claim 12, wherein the limited range of rotational motion is between 250 degrees and 300 degrees.

15. The apparatus of claim 12, wherein the shaft assembly comprises a round shaft having a first tab coupled to the first end and the inner cavity comprises a cylindrical cavity having a second tab, wherein the first tab is configured to engage the second tab to define the limited range of rotational motion.

16. The apparatus of claim 12, wherein the shaft assembly is configured to engage the inner cavity to define the limited range of rotational motion.

17. The apparatus of claim 9, wherein the housing is configured to prevent direct user manipulation of the first end of the shaft assembly.

18. The apparatus of claim 9, wherein the peripheral device comprises a light, a camera, or a microphone and wherein the limited range of rotational motion allows the light, the camera, or the microphone to be aimed.

19. The apparatus of claim 9, wherein the shaft assembly comprises a round shaft having a first tab and the inner cavity comprises a cylindrical cavity having a second tab, and wherein the first tab and the second tab are configured to engage to define the limited range of rotational motion.

20. A device for rotatably coupling to a peripheral device, the device comprising:
- a housing; and
- a shaft assembly comprising a first end a second end and defining a longitudinal axis extending between the first end and the second end,
- wherein the first end is positioned within the housing,
- wherein the second end is threaded and extends away from the housing,
- wherein the second end is configured to threadedly couple to the peripheral device by relative rotational movement between the peripheral device and the shaft assembly around the longitudinal axis in a first direction with a first torque,
- wherein the second end is configured to threadedly uncouple from the peripheral device by relative rotational movement between the peripheral device and the shaft assembly around the longitudinal axis in a second direction, opposite the first direction, with a second torque,
- wherein the housing and the first end are configured to resist rotation of the shaft assembly relative to the housing with a third torque, and
- wherein the third torque is greater than the first torque and less than the second torque so that:
  - with the peripheral device uncoupled from the second end, the peripheral device is rotatable in the first direction relative the housing with the first torque in order to couple the peripheral device to the second end without the shaft assembly rotating relative to the housing, and
  - with the peripheral device coupled to the second end, the peripheral device is rotatable in the second direction relative the housing with the third torque without the peripheral device rotating relative to nor uncoupling from the second end.

21. The device of claim 20, wherein the housing and the first end are configured so that a range of rotation of the shaft assembly relative to the housing is limited between a first rotational position and a second rotational position so that rotation of the peripheral device coupled to the second end in the first direction relative to the housing with a fourth torque, greater than the second torque, is stopped at the first rotational position.

* * * * *